United States Patent [19]
Iodice et al.

[11] Patent Number: 5,613,051
[45] Date of Patent: Mar. 18, 1997

[54] REMOTE IMAGE EXPLOITATION DISPLAY SYSTEM AND METHOD

[75] Inventors: David M. Iodice, Melbourne; David M. Bell, Palm Bay, both of Fla.

[73] Assignee: Harris Corp., Melbourne, Fla.

[21] Appl. No.: 360,262

[22] Filed: Dec. 21, 1994

[51] Int. Cl.$^6$ .................................................. G06F 13/14
[52] U.S. Cl. ........................................ 395/128; 395/130
[58] Field of Search ................................. 395/130, 128, 395/129; 345/127, 129, 130, 202

[56] References Cited

U.S. PATENT DOCUMENTS

| | | | |
|---|---|---|---|
| 5,029,228 | 7/1991 | Nonoyama et al. | 345/127 X |
| 5,065,346 | 11/1991 | Kawai et al. | 395/128 |
| 5,119,081 | 6/1992 | Ikehira | 395/128 X |
| 5,153,936 | 10/1992 | Morris et al. | 395/128 |
| 5,179,639 | 1/1993 | Taaffe | 395/128 |
| 5,239,625 | 8/1993 | Bogart et al. | 395/128 |
| 5,471,563 | 11/1995 | Dennis et al. | 395/128 X |

OTHER PUBLICATIONS

Wilczak, J. and Krause, K. "Details on a Radically Different Image Processing Approach", Advanced Imaging, Nov. 1993, pp. 50–52.

*Primary Examiner*—Mark K. Zimmerman
*Assistant Examiner*—Cliff N. Vo
*Attorney, Agent, or Firm*—Rogers & Killeen

[57] ABSTRACT

A system and method for storing image data in a location remote from a display device which uses the data. The system uses plural reduced resolution image data sets and geographical coordination between the image being viewed and the data sets to substantially reduce the bandwidth required to transmit the image data and to shorten the time needed for transmission. Automatic transmission of data needed may be utilized.

21 Claims, 4 Drawing Sheets

$$\begin{matrix} a_{00} & a_{01} & a_{02} & \cdots & a_{0,N-1} & a_{0N} \\ a_{10} & & & & & \\ a_{20} & & & & & \\ \vdots & & & & & \\ a_{m0} & & & & & a_{mn} \end{matrix}$$

FIG. 3

REMOTE IMAGE EXPLOITATION DISPLAY SYSTEM AND METHOD

BACKGROUND OF THE INVENTION

The present invention is related generally to systems and methods for storing and displaying imagery and, in particular, to systems and methods for displaying image data remotely from a storage device when the display and the storage device are interconnected by a limited bandwidth communications medium.

Prior to the advent of digital computing, most image processing was accomplished by analog methods. For example, conventional photographs (an analog mechanism) were taken of an object or area to be studied and the photograph was physically sent to a person for analysis. If more than one person was to analyze the image date on the photograph, plural copies of the photograph had to be made or the one photograph had to be used sequentially by the various persons. Presently, much of the imagery has moved into the digital domain and images are presently either (a) taken using analog means and subsequently converted into digital data or (b) taken using digital means with direct storage onto a digital storage device. Once in digital form, an image may be readily transmitted by digital or RF means to many different users for simultaneous use.

As the precision of digital imagery has increased, the size of the digital files needed to store the images has likewise increased dramatically. It is now not unusual for a digital image (for example, an image of land from an orbiting satellite) to contain over 1 Gigabytes of data. While such a large amount of data may be preferred by an analyst, the transmission of such data over conventional data transmission systems is unwieldy and may consume a relatively large amount of the available transmission capability of a particular transmission system. For example, a typical image may contain 12,000 pixels by 8,000 pixels of data, each pixel being 8–16 bits in length for a black and white image and 24–48 bits in length for a color image. In today's communications systems, a transmission speed of 256,000 bits per second is attainable; however, even such a system would require over 51 minutes to transmit an 8 bit image and almost five hours to transmit a 16 bit color image.

The analysis of large or high resolution images, accordingly, presents considerable difficulties in the transmission of the image data from the storage medium to the display device. Note that this difficulty is present even if the storage device is physically near to the display and parallel or bus communications can be established between the storage device and the display. The difficulties are made many times more problematic when the display is physically remote from the storage device and conventional remote transmission media are used, such as a non-conditioned telephone line which may be limited in bandwidth to 30,000 bits per second or less.

To reduce the transmission problems of image data, it is known to compress the data prior to transmission and to restore the data after receipt at the display end of the transmission medium. Generally, such compression techniques rely upon the fact that there are areas in an image in which the image does not change substantially and abbreviated coding sequences can be used to transmit such non-changing areas. While some reduction in the bandwidth required to transmit compressed images is realized by such techniques, they also generally tend to filter the image and cause a loss of resolution available. While there are compression techniques which are completely reversible at the receiving end of the medium (i.e., the image received can be restored to be exactly the stored image), such techniques do not generally result in a significant bandwidth reduction (i.e., no more than 50% reduction).

Conventional compression techniques for image data are often based on mathematical relationships among the data being transmitted and may not be at all related to the types of data of interest to an analyst. Thus, often conventional compression techniques may compress out exactly the portion of an image of most interest to an analyst.

Often image analysis proceeds from a view of an overall image to identify areas of interest followed by a closed review of the identified ares of interest. Only the identified areas of interest receive close scrutiny of the analyst and the remainder of the overall image is of little or no interest. In conventional display systems which merely transmit the image from the storage device to the display, a typical user is bombarded with detail (for which he must wait for the transmission) to obtain an overall view of the image. For example, a doctor wishing to review a CAT scan of a patient would generally first view a full body image to determine the areas of possible problems. In a typical full body image, over 100 megabytes of information would have to be transmitted. Even at a transmission rate of 28.8 kilobaud, such an image would take almost an hour for transmission. Upon review of the image, the doctor may select a portion, such as a liver, for particular scrutiny. While the doctor is now able to perform such scrutiny (because the entire image has been transmitted), a considerable amount of time has elapsed and many unnecessary bytes of data were transmitted.

It is accordingly an object of the present invention to provide a novel system and method for displaying remote image data in a time and cost efficient manner.

It is a further object of the present invention to provide a novel system and method for displaying remote image data without the need to transmit an entire image while not losing resolution of areas of an image of interest.

It is another object of the present invention to provide a novel system and method for automatically selecting a portion of an image to be transmitted related to the image size on the image display device.

It is still another object of the present invention to provide a novel system and method for displaying remote image data in which the portion of the image data transmitted from remote storage device is related to a request from a user.

It is yet another object of the present invention to provide a novel system and method for displaying remote image data in which a user can selectively obtain full resolution data of a portion of an image of interest to the user.

It is still a further object of the present invention to provide a novel system and method for displaying remote image data in which the system automatically determines the need for the transmission of additional image data as the user manipulates the image data previously transmitted to him.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 3 is a diagram illustrating a weighting matrix which may be used to develop reduced resolution data sets in the present invention.

DESCRIPTION OF PREFERRED EMBODIMENTS

Figure 1:
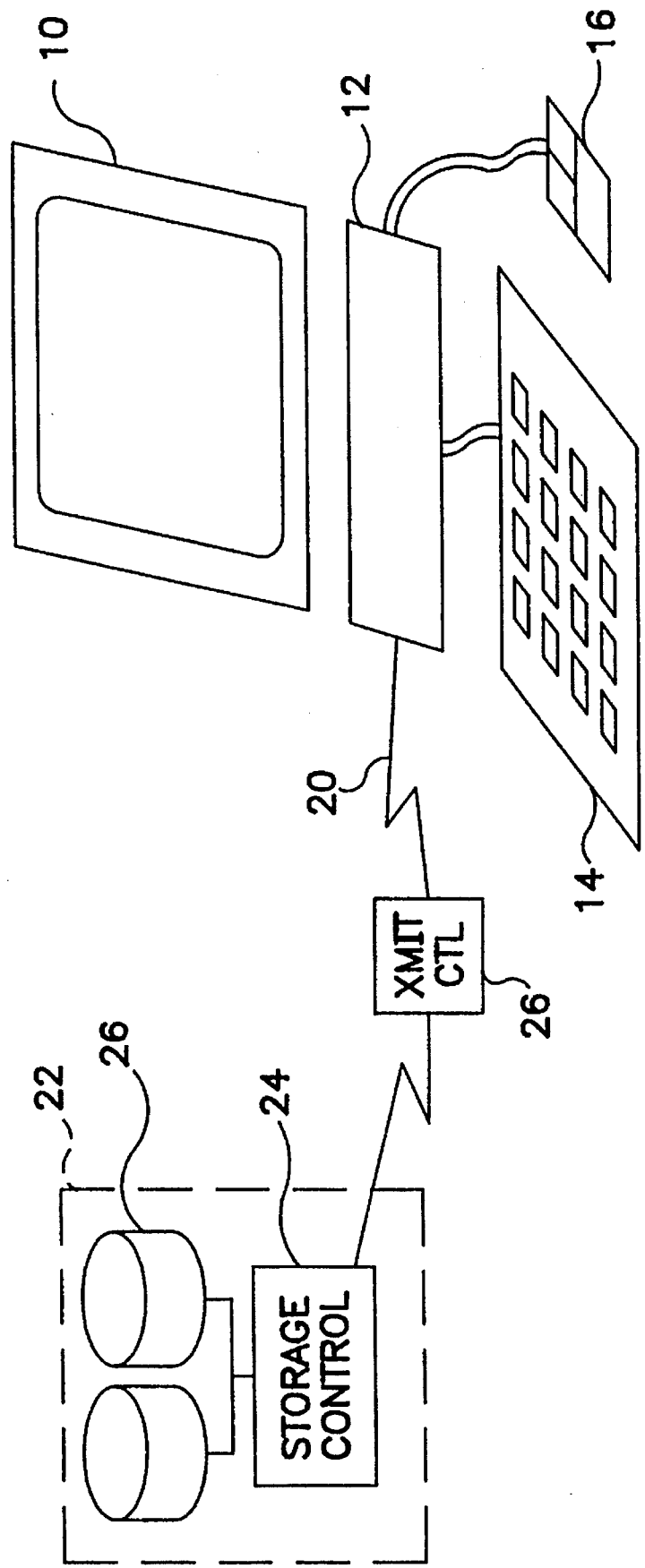
FIG. 1 is a pictorial representation of a hardware configuration which may be used in the present invention.

With reference to FIG. 1, an overall system of the present invention may be embodied in a digital computing system having a display 10 controlled by a processor 12, which is in turn controlled by an operator through a keyboard 14, a mouse 16, or a similar input device. The processor 12 may have associated with it both processing modules and local storage devices (not shown) as is typical in a personal computer and a workstation. The processor 12 may communicate over a transmission medium to a remote storage device 22, which comprises a storage controller 24 and one or more storage media 26. In a conventional fashion, the communication between the storage device and 22 and the processor 12 may be controlled by a transmission controller 26.

In overall operation, the storage device 22 contains one or more images stored digitally on the storage media 26, as described in more detail below. A user seated at the processor may enter an input command through the keyboard 14 or the mouse 16 indicating that he desires to view one of the images stored on the storage device 22. This command may result in a command being sent by the processor 12 to the storage device 22, requesting data for the specified image. In response, the storage controller 24 obtains the data for the desired image from the storage media 26 and transmits the data via the transmission medium 20 to the processor 12 for subsequent display on the display 10.

In a preferred embodiment, the processor 12, display 10, keyboard 14 and mouse 16 may be conventional components from a personal computer or a graphics display workstation. The storage media 26 may be any convention digital media, such as a magnetic disk (a "hard disk") or drum and the storage controller 24 may be a dedicated computer processor with access to the storage media 26. While the storage device 22 is described as being "remote" from the display 10, remoteness need not be a great physical distance. The remote storage device 24 may be miles away from the display 10 and interconnected by a telephone or radio link. The remote storage device 24 may also be physically close to the display 10 (perhaps even integrated within a single package) but communicate to the display through a transmission medium 20 of relatively limited bandwidth.

The image on the storage media 26 may be a digital representation of any type of image, including without limitation a visual image, an infrared image, any sensor's image of an area or structure. Typically, although not necessarily, such image data may be stored with adjacent storage locations on the storage media 22 representing the image data at adjacent locations within the field of the image.

Figure 2:
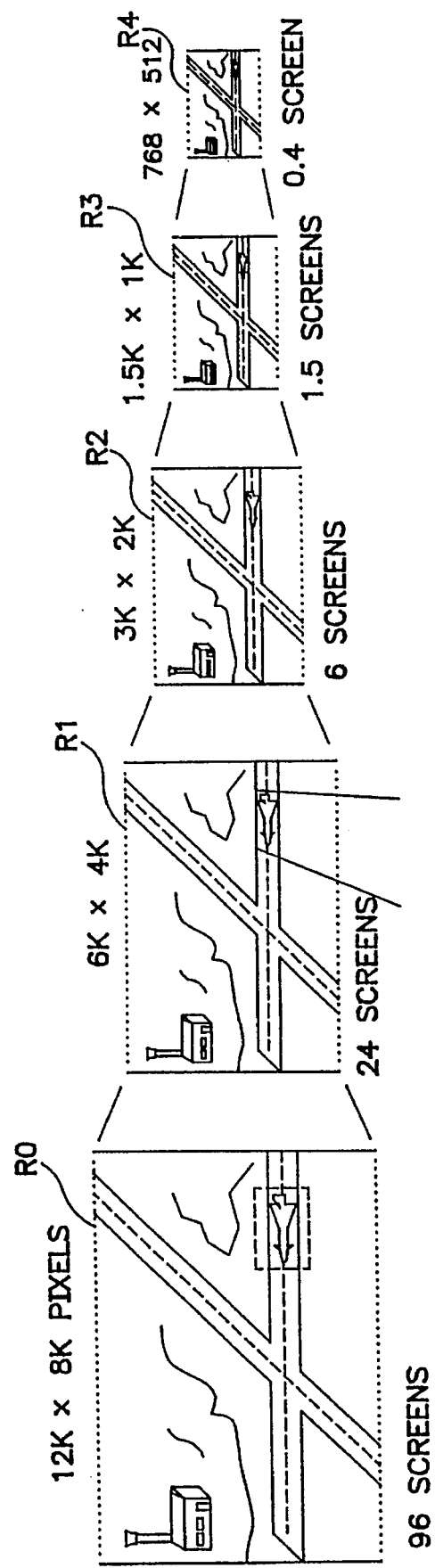
FIG. 2 is a pictorial representation of the plural resolution image data sets generated in a system of the present invention.

With reference now to FIG. 2, an image on the storage media 22 may represent a visual scene such as that shown in data set R0 of FIG. 2. The R0 data set is the original, full resolution image available to the system. For example, a typical R0 data set may include 12,000 pixels ("picture elements") horizontally and 8,000 pixels vertically. Each pixel represents the state of the image at a particular location. Depending upon the type of imagery and the precision of the system, each pixel may occupy one byte (e.g., for a black-and-white system having 256 shades of grey), or 6 bytes (e.g., for a color system (R,G,B) having 65,536 variations for each primary color), or any other number of bytes required by the type of data and its coding scheme.

With continued reference to FIG. 2, the system of the present invention generates plural lower resolution data sets from the R0 set. Each of these lower resolution sets are stored on the storage media 26. For example, as shown in FIG. 2, the system of the present invention may have but is not limited to a total of five resolution sets, R0, R1, R2, R3, R4, with each resolution set having a reduction in resolution by a factor of two (in each direction, horizontally and vertically) over its higher resolution set. Note that the storage required for each lower resolution set in one-fourth that required for its next higher resolution set. For example, if each pixel of R0 contains 1 byte, the R0 set contains 96,000,000 bytes, the R1 set contains 24,000,000 bytes, the R2 set contains 6,000,000 bytes, etc. In accordance with the present invention, the amount of resolution reduction between succeeding resolution sets is not fixed but may be varied to meet the requirements of a particular type of imagery and/or display requirements.

With reference to FIGS. 2 and 3, the reduction in resolution between adjacent sets may be accomplished by applying a two dimensional linear filter to the higher resolution set to develop the lower resolution set. In particular, a weighting matrix such as that shown in FIG. 3 may be applied to every other pixel in R0 to develop the associated pixel in R1. The weighting matrix may contain a matrix of coefficients, $a_{00}$, $a_{01}$, ... $a_{0n}$, ..., $a_{mn}$. The coefficients represent the weight applied to each of the corresponding pixels surrounding the pixel being calculated. The weight of each coefficient is multiplied by the value of its associated pixel and the total of all the products is taken and divided by the total weight to obtain the value for the pixel in the next lower resolution set. Typically, but not necessarily, the weighting matrix is symmetric about its center. In practice, the weighting coefficients can be expressed as fractions such that the sum of all the coefficients equals 1. In this way, the division step in the averaging/filtering is eliminated.

As the lower resolution sets are developed, the system of the present invention may retain information to identify where each pixel in the higher resolution set exists within the pixels of the lower resolution set. Such information represents an explicit geometric relation between the sets. Where the image data consists of plural data points for each image point (for example, 3 color points for each pixel), three R0 sets may be used (one associated with each color) and corresponding lower resolution sets may be generated for each R0 set. Alternatively, for a color image, each of the three color values for each pixel can be stored in a single array, each pixel becoming 3 bytes/words wide.

For additional efficiency, each of the resolution sets may be stored on the storage media 26 in a tiled manner which enhances the transfer of data to/from the storage media 22. For example, some disk units are manufactured such that 1,024 bytes of information are transferred at a time, even if only three bytes of data are needed by the requestor. In such systems, organizing the image data into tiles of 1,024 bytes which are stored contiguously may reduce disk storage requirements and may require a single disk access to read the desired data.

Figure 4:
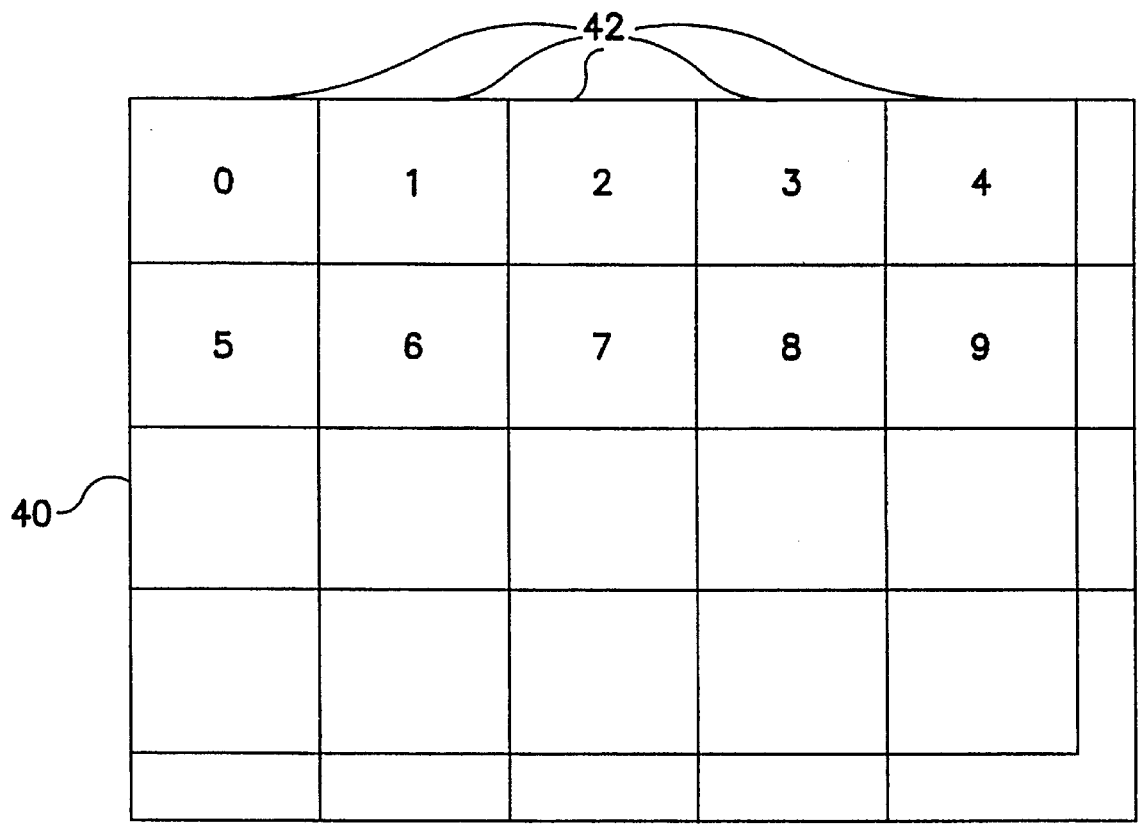
FIG. 4 is an example of the use of tiling which may be used to access the image data in the present invention.

With reference to FIG. 4, an image 40 may consist of plural pixels (digitally encoded) arranged associated with an array. By tiling, rectangular or square portions of the image are grouped together and stored together contiguously (usually) on the storage media 22. In the image of FIG. 4, the portion of the image within the square marked 0 may be considered a single tile. Likewise, others of the tiles marked 1, 2, 3 etc. are depicted in FIG. 4.

In one system according to the present invention, it has been found that tiles having 256 pixels (horizontally)×256 pixels (vertically) are advantageous. In other systems, tiles having up to 1,024×1,024 pixels have also been found advantageous.

Each of the tiled resolution sets may be additionally and recursively tiled a second time. In other words, each of the first level tiles may be tiled in a second level of tiling. Use of a second level of tiling enables the storage control system to be built to handle a single, fixed size system regardless of the size of the image. If the image being stored is and subsequently processed is very large, multiple second level tiles of a fixed size can still be used to process the image. The second level of tiling enables the system of the present invention to manipulate very large images not readily processed using conventional video techniques. The second level of tiling also makes the software associated with the storage controller independent of the size of the image.

Figure 5:
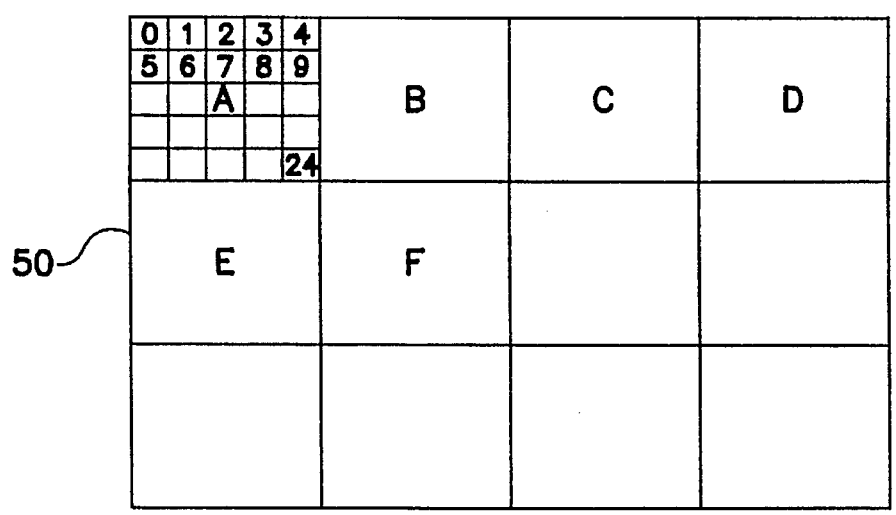
FIG. 5 is an example of the use of a second layer of tiling which may be used to access the image data in the present invention.

With reference to FIG. 5, the second level of tiling may be illustrated with respect to the image 50. In the second level of tiling, the first tiles 0, 1, 2, 3, 4, 5, 6, . . . 24 are recursively tiled into second level tiles A, B, C, . . . F, etc.

During the generation of the tiled resolution sets, the system of the present invention may also determine and store a histogram (i.e., the distribution of pixels with respect to gray level) of each resolution set. Additionally, the system of the present invention may determine the geographic relationship between the pixels. The geographic relationship is commonly stored along with the original image data.

Once the plural resolution sets have been made of an image, the system of the present invention may be utilized to substantially reduce the transmission time and/or bandwidth needed to effectively view the image. Initially, the user of the system specifies or permits the system to select a window on the display in which to place an image. For example, in a typical workstation having a display capable of viewing a 1k by 1k image, a window of 256 by 256 pixels may be selected. Upon identification of the image desired by the user, the system may select the resolution set associated with the desired image which fills the window. The storage controller may then obtain the desired resolution set from the storage media 26 and transmit it to the processor 12 for viewing on the display 10. Typically, the first set viewed will be one of the sets with relatively low resolution and a transmission of relatively short duration will be needed to send the image data.

Upon viewing the image data from the reduced resolution set, the user may select a portion of the image for additional and closer scrutiny. The user may make his selection on the display screen using any conventional process, such as a cursor and an expending box or simply using the cursor to outline the area of interest. Once the user has indicated what area of the image is of interest, the system again determines which resolution set contains the image data which will fill the window with the image outlined by the user. Generally, for the first area of interest, the image area will be contained in a portion of one of the higher resolution sets. The storage controller can then directly obtain the image data tile or tiles which contain the desired image at the higher resolution and transmit the image data to the display 10. At the display, the higher resolution image may be displayed in the same window or in another window, at the user's direction. In a conventional fashion, if two windows are used, one of the windows can partially overlie the other or they can be non-interfering with each other.

In one embodiment of the present invention, it has ben found that the calculation of "ground sample distance" can be used to assist in selecting the proper resolution set. For geographically related image data, the original image data has associated with it a particular ground sample distance ("GSD"), that is, the distance in the image between adjacent pixels. For example, an image covering 100 kilometers in width stored in an array of pixels having 10,000 pixels across the horizontal would have a ground sample distance of 100 km per 10,000 pixels or 10 meters per pixel. If the resolution sets are related, as in FIG. 2, by a factor of 2, each of the resolution sets has a ground sample distance twice as large as its next higher resolution set. If, for example, the R0 has a GSD of 10 meters, an R1 set could have a GSD of 20 meters, the R3 set a GSD of 40 meters, the R4 set a GSD of 80 meters, etc. The proper resolution set for the first image may be determined by dividing the number of pixels along one direction in the window into geographic length along the same direction in the image to determine the needed ground sample distance. The resolution set having the closest, but lower, ground sample distance may be used. For example, if the total image is 100 km in width and the horizontal dimension of the window contains 500 pixels, the resolution set having a ground sample distance of less than 200 meters per pixel may be selected. Of course, the determination of the proper resolution set will usually require an examination of both the horizontal and vertical directions of the window.

Image data at the display 10 may be manipulated by the processor 12 in a conventional fashion. For example, the image may be rotated, moved about the screen, adjusted for contrast or intensity, etc. Some manipulations may require additional data which has not yet been transmitted (when a rectangular image is rotated, for example). Because the system of the present invention may have generated tiled data, a request to the storage controller from the processor 12 may be readily filled because the desired additional data is in tiles adjacent to the ones previously sent and thus can be readily retrieved. If desired, suitable data buffers can be added to the system so that expected image data is being sent to the processor 12 before it is actually needed by the display 10 so that it can be quickly displayed when needed and thus the user is not required to wait for more data while it is transmitted.

It is common with current sensors that image data may have two to three times better resolution at the center of the original image than at the sides of the image. Because in the present system the image data has been tiled and geographically coordinated within the system, the image sent to the display may be adjusted for varying resolution data across the image and displayed with a constant resolution (if desired).

In an alternative embodiment, the system of the present invention may use a "Fit To Window" concept in which the image presented on the display is calculated exactly to fit the window. For example, if the ground sample distance ("GSD") of the image is 200 meters and the relevant resolution sets have data with a GSD of 160 meters and 320 meters, the system may select tiles from the 160 meter set and recompute the data for each of the tiles on the display such that the display shows a 200 meter GSD image. Because only the required data is transmitted by the system from the storage device, the computational burden on the processor 12 to recompute the data to fit the window is minimized. Similarly, the system of the present invention can permit the user to change the size of the window and the system can dynamically recompute and resize the image as appropriate.

As can be readily appreciated by those skilled in the art, the present invention differs from many conventional systems by the fact that the present system pulls down from storage only the data needed by the user, in contrast to systems which push all the data from the storage that might be needed on the other side of the transmission medium. This advantage provides a considerable savings in the transmission bandwidth required to move the image data from the storage device to the display and/or in the time needed to obtain the data at the display. Once the data has been provided to the processor 12, it may be manipulated using as necessary the histogram data derived during the preprocessing of the image data.

The system of the present invention has further utility in systems in which plural users are simultaneously querying a single storage device or storage system for image data. In such systems, the delays in receiving large images found in conventional systems are compounded by the fact that each user must contend not only with the delays associated with his own queries but with the queries of other users. By substantially reducing the time needed by each user, the present system provides a method of permitting more simultaneous users on a shared storage system without unnecessarily degrading image storage response time.

While the foregoing description discussed the resolution sets as being preprocessed and stored prior to the user requesting image data, the present invention also includes a system in which none or only part of the resolution sets have been preprocessed. As will readily be understood by those skilled in the art, a tradeoff exists in using the present invention between image storage requirements and the time between when a user first requests a particular image. The most responsive system may have precomputed all the resolution sets; while the more storage efficient system may have precomputed none or just a few of the desired sets.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A system for displaying an image having a first level of resolution and being represented by a first set of digital data across a bandwidth-limited transmission medium, comprising:

reduced resolution generating means for creating plural, successively reduced resolution sets of digital data from said first set of digital data;

a digital storage means for storing said first set of digital data and said reduced resolution sets of digital data;

image display means remote from said digital storage means for visually displaying an image having a selective area;

a transmission medium operatively interconnecting said digital storage means and said image display means;

first control means for selecting an image area on said image display means;

second control means for automatically selecting and transmitting the appropriate one of said reduced resolution sets of digital data related to the size of a selected image area and a desired image resolution; and, third control means for dynamically adjusting the resolution of the digital data transmitted to the image display means to the desired image resolution of the image area.

2. The system of claim 1 further comprising:

means to store portions of said reduced resolution data sets in plural tiles, the sizes of said tiles being related to the access characteristics of said digital storage means.

3. The system of claim 1 further comprising:

means for displaying plural images on said image display means, each image having a different desired image resolution.

4. The system of claim 3 wherein one of said images corresponds to a portion of another of said images being simultaneously displayed.

5. The system of claim 4 wherein the corresponding image changes in correspondence to the movement of a pointing device across said other image being simultaneously displayed.

6. The system of claim 3 wherein each of said reduced resolution data sets associated with each of the plural images is individually adjusted to account for the desired resolution of each image.

7. A system for displaying image data in a display remote from a storage device storing said image data, said image data representing an image of a predetermined size, comprising:

a communications medium functionally interconnecting said display and said storage device for the transmission of image data;

means for generating and storing at said storage device plural sets of image data, each of the sets representing said image at a different resolution;

means for arranging the data within each of said plural sets for efficient storage on said storage device;

means for selectively transferring a portion of one set of data along the communications medium from the storage device to the display; and, means for selecting a portion of the image from among the plural sets to be transferred from the storage device to the display.

8. The system of claim 7 wherein said means for selecting a portion of the image further comprises means for adjusting the selected portion to fit a predetermined portion of the display.

9. The system of claim 8 wherein said means for selecting a portion of the image further comprises means to adjust said image for variations in resolution across the display.

10. The system of claim 7 wherein said means for generating and storing further comprises means for developing plural reduced resolution data sets, each set having a resolution related by a factor of two to the resolution of at least one other resolution data set.

11. The system of claim 10 further comprising means to determine a histogram of the intensity of the image data of each resolution data set.

12. The system of claim 7 wherein said means for generating and storing further comprises means for developing plural reduced resolution data sets, each set having a resolution related by a factor of at least two to the resolution of at least one other resolution data set.

13. A method of displaying data on a display which is remote from a storage device storing image data, comprising:

(a) providing a display and a storage device remote therefrom;

(b) functionally interconnecting the display and the storage device;

(c) storing an image at a predetermined resolution in said storage device;

(d) generating plural reduced resolution images of said image, each of the plural reduced resolution images having a different resolution associated therewith; and, (e) selectively transferring a portion of one of the reduced resolution images in response to a request from the display for an image.

14. The method of claim 13, further comprising the step of:

(d)(1) storing the plural reduced resolution images in tiles, the size of the tiles being related to the data transfer characteristics of the storage device.

15. The method of claim 14, further comprising the step of:

(d)(2) storing the tiles of the plural reduced images in a second level of tiles.

16. The method of claim 14 wherein the size of the tiles are based on the storage characteristics of the storage device.

17. The method of claim 13, further comprising the step of:

(f) adjusting the transferred portion of the image to fit the area of the display available for the image.

18. The method of claim 17 wherein the area of the display available for the image is smaller than the area of the display.

19. The method of claim 13, wherein the reduced resolution images are developed based on linear filtering of higher resolution images.

20. The method of claim 19 wherein the linear filtering includes a weighting matrix which is symmetrical.

21. The method of claim 13, further comprising the step of:

(g) adjusting the transferred image with respect to the resolution of the image across the display.

* * * * *